Dec. 8, 1970   V. E. HAMILTON ET AL   3,546,064
ADHESIVE AND GLASS LAMINATE BONDED THEREWITH
Filed Oct. 6, 1966
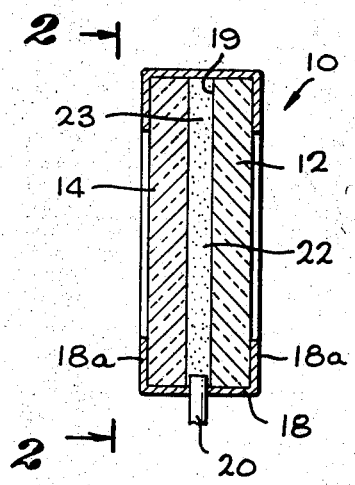
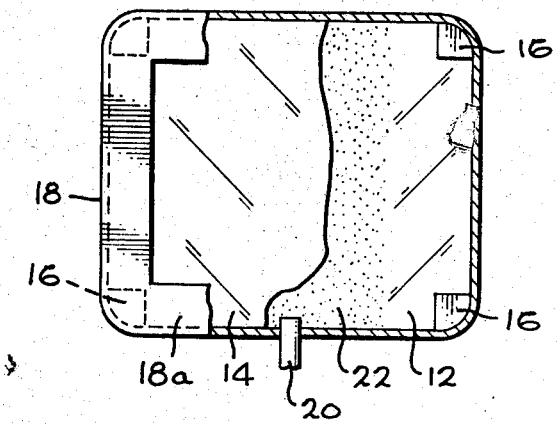
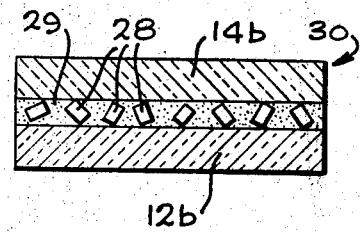
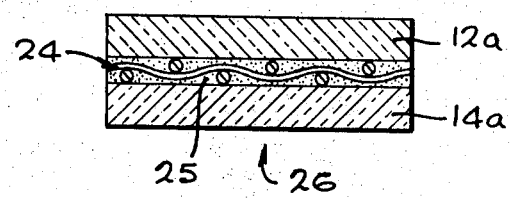
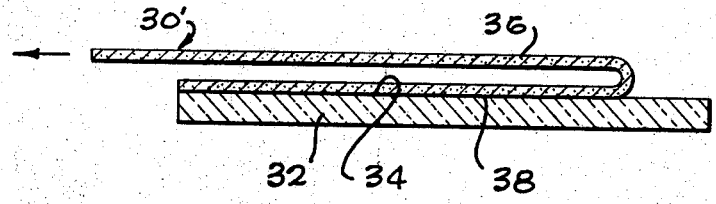
INVENTORS
VERN E. HAMILTON
LUTHER M. ROSELAND
BY
ATTORNEY

United States Patent Office 3,546,064
Patented Dec. 8, 1970

3,546,064
ADHESIVE AND GLASS LAMINATE
BONDED THEREWITH
Vern E. Hamilton, Palos Verdes Estates, and Luther M. Roseland, Santa Ana, Calif., assignors, by mesne assignments, to McDonnell Douglas Corporation, Santa Monica, Calif., a corporation of Maryland
Filed Oct. 6, 1966, Ser. No. 584,912
Int. Cl. B32b 17/10, 27/38, 27/40
U.S. Cl. 161—185
13 Claims

ABSTRACT OF THE DISCLOSURE

Glass laminate, e.g., a high strength safety glass or acoustical glass, adhesively bonded together by a cured urethane polymer containing epoxy resin and a member selected from the group consisting of dialkyl adipates, dialkyl sebacates, and dialkyl azelates; and an adhesive formulation particularly designed for bonding such glass laminate at room temperature, containing urethane polymer, epoxy resin, a polyamine or polyol curing agent, and such member noted above, the amount of curing agent employed being only sufficient to react stoichiometrically with the urethane polymer, the epoxy resin and such member functioning as plasticizers.

---

This invention relates to the fabrication of safety glass or acoustical and architectural glass in the form of laminates comprising two or more glass plates, and to a novel adhesive composition designed particularly for bonding adjacent glass plates of said laminate, to produce laminated windows or lights having improved strength characteristics, and other improved properties.

In prior practice for the manufacture of glass, for example, safety glass, a polyvinyl butyral sheet is positioned between adjacent glass plates, and the unit is subjected to heat and pressure to produce bonding of the adjacent plates by the polyvinyl butyral bonding material. However, by means of this procedure involving the application of substantial pressures a large number of stresses are built into the glass laminate. This reduces the ultimate strength of the laminated glass and also renders it prone to delamination.

Further, ordinary safety glass has characteristics such that when impacted, a relatively great impact force is required before the energy absorbing qualities of the light take effect, resulting in the formation of multiple cracks extending laterally outward from the point of impact. At relatively low temperatures, ordinary safety glass actually loses its characteristics as such, and tends to shatter when impacted, and at high temperatures the light tends to "give" excessively and an object striking the glass will tend to penetrate through the glass.

In our copending applications Ser. No. 461,647, filed June 7, 1965, and Ser. No. 584,854, filed Oct. 6, 1966, there is described an improved adhesive formulation comprising polyurethane-epoxy mixtures, and preferably including a chlorinated biphenyl, which provides a strong, transparent bond between adjacent glass plates or panels, and permitting formation of glass laminates by curing the bonding adhesive at ambient temperature and without the application of pressure, and resulting in glass laminates having high adhesive strength and toughness and increased strength and improved resistance to delamination. The chlorinated biphenyl component preferably employed in such adhesive formulations aids in reducing the viscosity of the adhesive formulation, advantageously increasing the index of refraction of the adhesive bond, and aids to increase the work life or period of duration of lubricity of the resin formulation during working.

However, although the presence of such chlorinated biphenyl provides the above noted important advantages, it has been found that the presence of the chlorinated biphenyl component in the adhesive formulations of our above copending applications imparts a disagreeable odor to the glass laminate produced employing such adhesive as bonding agent, and this disagreeable odor from such glass laminates tends to reduce its marketability and acceptance in the trade.

It is accordingly an object of this invention to provide improved glass laminates, particularly transparent glass laminates especially designed for use as safety glass or acoustical or architectural glass, such laminates being bonded by a strong, transparent adhesive.

Another object of the invention is the provision of glass lamintaes formed of a plurality of glass panels bonded together by an adhesive between each of the adjacent layers, such laminate being readily formed and having improved strength and resistance to delamination, particularly when employed as safety glass.

Another object is to provide glass laminates, adjacent plates of which are bonded together by a controlled thickness of an adhesive, the fabrication of such laminates being carried out and the adhesive bond cured, without the application of high pressures and elevated temperatures, thus avoiding excessive stressing of the glass, the resulting bonded glass laminates being substantially free of any disagreeable odor from the cured adhesive.

A particular object of this invention is to provide a novel readily prepared adhesive composition for bonding adjacent glass plates to form a glass laminate as noted above, and providing a strong tough transparent bond between such plates, without imparting any disagreeable odor, and conferring other important characteristics on the resulting laminate.

Other objects and advantages of the invention will appear hereinafter.

It has now been found that polyurethane-epoxy adhesive mixtures of the type generally described in our above copending applications, which contain in place of the chlorinated biphenyl, a member selected from the group consisting of dialkyl adipates, dialkyl sebacates, and dialkyl azelates, as further defined below, in addition to providing a strong, transparent bond when employed as a bonding adhesive between ajdacent glass plates or panels, confer other important properties on such glass laminates or plates, including the provision of a tough cured bond which is substantially free of odor. It has also unexpectedly been found that not only do the adipate, sebacate or azelate additives noted above and defined in greater detail below, function to provide these plasticizing and workability characteristics and high adhesion to glass, similar to that afforded by the chlorinated biphenyls, but that such adipates, sebacates or azelates, when employed in place of the chlorinated biphenyls, provide a broader operative temperature range, together with improved low temperature flexibility of the cured bond, as compared to the adhesive formulations containing the chlorinated biphenyls. It is particularly noteworthy that many other known plasticizer components such as the phthalates and glycolates are unsuitable, particularly in that such additives in the polyurethane-epoxy formulations described more fully hereinafter, do not produce the required degree of adhesion of such adhesive formulation to glass.

The urethane polymer-epoxy resin adhesive formulation including the dialkyl adipate, the dialkyl sebacate or the dialkyl azelate of the invention employed as the bonding material between the adjacent glass plates, has relatively low viscosity, permitting easy application and uniform flow between the adjacent surfaces of the plates being bonded, and permitting application of a controlled uniform thickness of bond between the plates, and forming a void-free bond. By employing the novel fluid adhesive of the invention for bonding together glass panels, glass laminates can be readily fabricated by curing the bonding adhesive at ambient temperature and without the application of pressure.

In the manufacture of safety glass, the use of the novel adhesive hereof results in the production of a glass laminate having improved energy absorbing net-like qualities over a broad range of temperature of from about $-100°$ F. to about $+250°$ F. so that upon impact, only a relatively minor amount of force is required to utilize such net-like quality of the laminate. Also, since no large pressures are needed for bonding the glass laminate, there will be a minimum of built-in stresses, resulting in the above noted increased ultimate strength and delamination resistance of the laminate.

In addition to the above properties, when the glass laminate is employed as acoustical or architectural lights, e.g., for partitions or panels, the glass laminate has sound absorption and energy dissipation properties over a broad acoustical range and permits homogeneity of dyeing when employing the adhesive of the invention, for producing colored panels.

The glass plates employed to form glass laminates utilizing the adhesive of the invention can be of any desired thickness, e.g., from about ⅛ inch to about ½ inch thick, and the glass plates can be formed from any of the types of glass generally employed for fabricating safety glass and acoustical glass such as the usual soda lime glass. The thickness of the adhesive bond formed between the adjacent glass plates can vary, but is relatively thick. Thus, for example, in the production of safety glass, a cured adhesive bond thickness of about 0.012 to about 0.030 inch thick can be provided, and for acoustical or architectural glass, substantially thicker cured adhesive bonds can be provided, e.g., of the order of about 0.040 to about 0.060 inch thick. The number of plates bonded together to form a laminate and the number of adhesive or glue lines between adjacent plates of such laminate can of course be varied. Thus, for safety glass, for example, a glass laminate can be provided according to the invention having two glass plates bonded together with one adhesive bond between plates, and for acoustical or architectural glass up to five glass plates can be provided in the laminate, employing therein up to four adhesive or glue lines. However, it will be understood that the invention is not to be taken as limited by any particular thickness of glass plates, thickness of cured adhesive bond employed for bonding the plates, or the number of glass plates or glue lines in the resulting laminates.

Various types of liquid urethane polymers or elastomers can be empolyed to produce the adhesive formualtions employed as bonding material for the glass plates according to the invention. These materials can be cured to a strong, flexible or rubbery solid material. Illustrative of the liquid urethane polymer base material of these adhesive formulations are the "Adiprene L" series of liquid urethane elastomers marketed by Du Pont. These materials are fully saturated polymers which contain, e.g., from about 4.0% to about 10% isocyanate groups by weight. Typical specific examples of such liquid urethane elastomers are the Adiprenes L–100, L–167, and L–315. The L–100 material contains about 4.0% to about 4.3% isocyanate groups by weight, the L–167 material about 6.1% to about 6.5% isocyanate groups, and the L–315 material about 9.2% to about 9.6% isocyanate groups. These polymers are cured by reaction of the isocyanate group with curing agents, e.g., polyamines or polyol compounds. These materials can also be cured by reaction with the moisture present in the air, but this is difficult to control consistently with varying relative humidity, and requires relatively prolonged curing time and is therefore not preferred. A preferred urethane elastomer for purposes of the invention is Adiprene L–100.

The physical properties of Adiprene L–100 are set forth in the table below:

TABLE I

Specific gravity—1.06
Viscosity at 86° F.—14,000–19,000 cps.
Viscosity at 212° F.—500–600 cps.
Appearance—A honey-colored liquid.
Odor—None.
Flash point—480° F.
Solubility—Soluble in most common solvents; toluene, methyl ethyl ketone, ethyl acetate, $CCl_4$.

Other examples of suitable urethane polymers which can be employed include the polyester based polyurethanes such as those marketed as the Vibrathanes by Naugatuck Chemical Company, and the polyether based polyurethanes such as the product marketed as Multrathane F–196 by Mobay Chemical Company.

If desired, mixtures of the urethane polymers can be empolyed, for example, a mixture of Adiprene L–100 and Adiprene L–167, or of Adiprene L–100 and Adiprene L–315.

Specific examples of polyamine and polyol curing agents which are preferably employed in the liquid urethane polymer adhesive formulations of the invention are 4,4'-methylene-bis-(2-chloroaniline), known as MOCA, triethanolamine, 1,4-butanediol, castor oil, diethylene triamine, di-amino diethylamine, and the like. MOCA has been found particularly suitable.

The addition of an epoxy resin, e.g., the reaction product of epichlorhydrin and bisphenol A, preferably in the form of a liquid, to the adhesive formulation of urethane polymer is particularly advantageous. The epoxy resin functions in the urethane polymer adhesive formulation hereof, as a plasticizer or diluent, and lengthens the work life or duration of the period of lubricity and flowability of the adhesive formulation. Also, the epoxy resin has a high index of refraction, e.g., of the order of about 1.58, and thus contributes to increasing and improving the index of refraction of the adhesive bond to more closely approach and match the index of refraction of the glass plates. Further, the incorporation of the epoxy resin into the urethane polymer adhesive improves the adhesion of the formulation to glass plates as compared to a urethane polymer adhesive formulation in the absence of such epoxy resin.

In addition to the preferred epoxy resins produced by reaction of epichlorhydrin and bisphenol A (the diglycidyl ether of bisphenol A), other epoxy resins can be employed in the urethane polymer adhesive formulations hereof, including glycidyl ethers of glycerol, glycidyl ethers of bisphenol F, glycidyl ethers of tetrakis (hydroxyphenyl) ethane, and the like. Also, epoxy resins produced by reaction of epichlorhydrin, butadiene dioxide or diglycidyl ether, with mononuclear and polynuclear phenols such as resorcinol, hydroquinone, 4,4'-dihydroxyl biphenyl and dihydroxyl diphenyl sulfone may be employed.

Preferably, although not necessarily, both the urethane and epoxy resins are chosen with respect to molecular weight, so that they are in liquid form. However, for example, if desired, a solid epoxy resin can be employed, e.g., by diluting same with a suitable diluent such as the dialkyl adipate, dialkyl sebacate or dialkyl azelate component of the adhesive formulation.

The proportions of epoxy resin to urethane polymer in the adhesive formulation of the invention can range by weight from about 1 part of epoxy resin and 99 parts of urethane polymer, to about 60 parts of epoxy resin and about 40 parts of urethane polymer, based on 100 parts of the sum of both the urethane polymer and epoxy resin.

For safety glass, within the above noted range, preferably a minimum of about 80 parts of polyurethane and a maximum of about 20 parts of epoxy resin is employed, particularly good results being obtained employing about 90 to about 98 parts of urethane polymer and about 10 to about 2 parts of epoxy resin, and for acoustical or architectural glass, preferably a maximum of about 60 parts of polyurethane and a minimum of about 40 parts of epoxy resin is employed. When employing the larger amounts of polyurethane and the smaller amounts of epoxy resin noted above for producing safety glass, a tough and elastic laminate is thereby provided. When employing the smaller amounts of polyurethane and larger amounts of epoxy resin for producing acoustical or architectural glass, a softer cured bond is provided.

An amount of polyamine or polyol curing agent is employed which is less than stoichiometric for reaction with both the polyurethane and the epoxy resin present in the adhesive formulation. That is, the amount of curing agent preferably employed is such that most or practically all of the curing agent present reacts with all of the isocyanate groups in the urethane propolymer, at room temperature. The curing agents employed in the resin formulation of the invention, react at about room temperature substantially entirely with the urethane resin for curing same, and since such curing agents react very slowly with epoxy resins at room temperature, there is substantially no reaction of such curing agents with the epoxy resin present in the adhesive. Accordingly, the curing agent is employed preferably in approximately stoichiometric proportions with respect to said urethane polymer. Indeed, it has been found most desirable that there be no substantial amount of excess curing agent present over and above that amount which reacts stoichiometrically with the polyurethane, since if such excess curing agent is present, curing of the composition to a suitable solid form at ambient temperature requires an excessive period of time. It is thus believed that the epoxy resin present remains in the adhesive formulation in its initial form and functions essentially as a plasticizer or diluent. However, the invention is not to be taken as limited by any theory as to the function of the epoxy resin in the adhesive formulation of the invention.

The amount of curing agent which can be employed in the resin formulation of the invention can vary between about 4 to about 20 parts by weight per 100 parts of the urethane polymer component. However, amounts of curing agent outside this range can be employed, depending upon the stoichiometric requirements of the particular polyurethane or mixtures thereof. It has been found preferable to employ about 10 to about 18 parts by weight of the curing agent per 100 parts of the urethane polymer component, especially when utilizing Adiprene L–100 as urethane polymer, the use of approximately stoichiometric proportions of curing agent with respect to such polyurethane component, e.g., about 13 parts of curing agent such as MOCA, per 100 parts by weight of such polyurethane component, providing superior results.

According to the invention, there is incorporated into the urethane polymer formulation, in addition to the epoxy resin noted above, a dialkyl adipate, a dialkyl sebacate or a dialkyl azelate. Preferably, each of the alkyl groups of said dialkyl adipate or sebacate is a straight chain alkyl containing from about 4 to about 12 carbon atoms. Such alkyl groups include n-butyl, n-pentyl, n-hexyl, n-heptyl, n-octyl, n-nonyl, n-decyl, n-undecyl, and n-duodecyl. Good results particularly from the standpoint of improved strength characteristics are obtained empolying dialkyl adipates, dialkyl sebacates or dialkyl azelates wherein the alkyl groups are each a straight chain alkyl containing from about 8 to about 10 carbon atoms, e.g., n-octyl, n-nonyl and n-decyl. The two alkyl groups in the dialkyl adipate, the dialkyl sebacate and the dialkyl azelate can be the same or different for example, a dialkyl adipate can be employed wherein one alkyl group is decyl and the other alkyl group nonyl, and similarly for the dialkyl sebacate and azelate. A single dialkyl adipate, dialkyl sebacate or dialkyl azelate can be employed in the adhesive formulation of the invention, or if desired, a mixture thereof can be employed, e.g., a mixture of a dialkyl adipate and a dialkyl sebacate, or a mixture of a dialkyl adipate and a dialkyl azelate.

The dialkyl adipates and dialkyl sebacates have been found superior to the dialkyl azelates for purposes of this invention. It has been found that best results are obtained when employing as additive according to the invention didecyl adipate, dibutyl sebacate or dioctyl sebacate.

Dialkyl adipates, dialkyl sebacates or dialkyl azelates containing branched chain alkyl groups are relatively ineffective, since the use of such branched chain additives does not result in the required adhesion of the cured bond to glass in a period of time considered to be economically feasible.

Incorporation of the dialkyl adipate, dialkyl sebacate or dialkyl azelate additive component into the resin formulation of the invention aids in reducing the viscosity of the adhesive formulation and also aids to increase the work life or period of duration of lubricity of the resin formulation during working. Also, the presence of these above-noted additive components increases pot life of the adhesive following incorporation of the curing agent, e.g., from about ½ hour in the absence of such additives, to the order of about 2 hours. In addition, the incorporation of such additives increases the operative temperature range of the resulting adhesive formulation, and imparts flexibility to the cured adhesive bond at greatly reduced temperatures, e.g., of the order of 0 to about −70° F. Also, of particular importance the incorporation of the adipate, sebacate or azelate additive into the urethane polymer-epoxy adhesive formulation of the invention results in the formation of a clear, transparent, substantially odorless adhesive bond, and effectively securing with high adhesion the adjacent glass plates or lights of a glass laminate.

The amount of the above described dialkyl adipate, dialkyl sebacate or dialkyl azelate which can be incorporated into the adhesive formulation of the invention can vary, but generally ranges from about 2 to about 50 parts, based on 100 parts of both, that is, the sum of the urethane polymer and epoxy resin components, by weight. Preferably, between about 4 and about 40 parts of the adipate, sebacate or azelate component is employed, on the above basis. When the adhesive formulation is employed for producing safety glass, smaller amounts of the adipate, sebacate or azelate component are employed, and for producing acoustical glass panels, larger amounts of such additive components are employed, within the above noted ranges. Thus, for example, for safety glass, a proportion of about 4 to about 10 parts of such additive components have been found particularly effective, and for acoustical glass about 30 to about 40 parts on the above basis.

Certain organic silanes, particularly trialkoxy silanes, can be incorporated in the adhesive formulation of the invention to further improve adhesion of the cured bond to glass and increase the resistance of such bond to humidity and water. In such trialkoxy silanes, the alkoxy groups are each preferably lower alkoxy groups, e.g., of about 1 to about 4 carbon atoms, particularly methoxy and ethoxy groups, and the silane also carries an additional group, such as an amino or epoxy group, which is capable of reacting with the urethane polymer component of the resin system. It is believed that the alkoxy groups of the silane react with the glass substrate, to produce the above noted improved adhesion of the cured bond to glass. Hence, the above trialkoxy silanes are considered to be bifunctional silanes in that they contain one functional group capable of reacting with the resin system and the other being capable of reacting with the glass substrate.

Representative of such trialkoxy silanes are glycidyl oxypropyl trimethoxy silane, marketed as Silan A-187, gamma-aminopropyl triethoxy silane, marketed as Silane A-1100 and 3,4-epoxycyclohexylethyl trimethoxy silane, marketed as Silane A-186, and aminoethyl aminopropyl trimethoxy silane, marketed as Z-6020, by Dow Corning Company. Such silanes can be empolyed in amounts ranging from about 0.05 to about 2.0 parts, preferably about 0.2 to about 0.5 part, per 100 parts by weight of the sum of the urethane polymer and epoxy resin components.

Other optional components such as ultra-violet light absorbers can be added to the adhesive formulation. Illustrative of such light absorbers are the components 2-(2'-hydroxy, 5'-methyl phenyl) benzotriazole, marketed as Tinuvin P, and 2-hydroxy-4-methoxy benzophenone, marketed as Cyasorb UV-9. These ultra-violet light absorbers can be employed in amounts ranging from, for example, about 0.5 to about 7% by weight of the sum of the urethane polymer and epoxy resin components.

Also, there can be added optionally to the adhesive formulation a trace of a whitener, e.g., the whitener marketed as Perox blue, and understood to be an anthraquinone dye. The trace amount of whitener thus added to the formulation tends to mask off any yellow coloration which may be imparted to the bonding or adhesive layer following curing.

The following are examples illustrating the novel adhesive formulation of the invention which can be employed in producing improved glass laminates in the form of safety glass, or acoustical or architectural glass, the amounts set forth being given in terms of parts by weight.

As previously noted, in the production of safety glass and acoustical glass laminates used for sound absorption as partitions and panels, a relatively thick glue line or adhesive bonding line of controlled thickness is required. For this purpose, when fabricating the glass laminate and applying the adhesive between the adjacent glass plates or panels to be bonded, a suitable spacer means is usually employed. Thus, for example, the adhesive can be applied to one or both surfaces of adjacent glass panels to be bonded together and the glass panels are brought together with the proper thickness of adhesive bond provided by using spacers to adjust the desired adhesive thickness, or the glass panels can be initialy held together as a unit with spacers, corresponding to the desired thickness of bond between adjacent surfaces, the edges of the laminate can be taped and adhesive inserted into the space between the adjacent glass panels enclosed by the periphery of tape.

According to another embodiment for controlling the thickness of the adhesive bond, a loosely woven glass mat can be impregnated with the adhesive, or the adhesive can be applied over the mat and the adjacent glass plates then brought together with the adhesive-impregnated woven mat sandwiched between the plates. Alternatively, such mat can be placed between the glass plates or panels, and with the unit supported in this position, the adhesive can be introduced into the space occupied by the mat, impregnating the mat and filling such space. The glass mat preferably should have an index of refraction close to that of the adhesive bond. The glass mat functions as a carrier for the adhesive, as a spacer for the glass plates and as a reinforcement for the adhesive bond and the laminate as a whole.

TABLE I

| Components | A | B | C | D | E | F | G | H | I | J | K | L | M |
|---|---|---|---|---|---|---|---|---|---|---|---|---|---|
| Adiprene L-100 | 75 | 75 | 60 | 75 | 70 | 55 | 90 | 80 | 60 | 95 | 98 | 90 | 75 |
| Epon 828 | 25 | 25 | 40 | 25 | 30 | 45 | 10 | 20 | 40 | 5 | 2 | 10 | 25 |
| MOCA | 10 | 10 | 8 | 10 | 9 | 7 | 12 | 10 | 8 | 12.5 | 12.8 | 12 | 10 |
| Dinonyl adipate | 15 | | | | | | | | | | | | |
| Didecyl adipate | | 20 | | | | 5 | | | 40 | | 5 | | |
| Diundecyl adipate | | | 25 | | | | | | | | | | |
| Diheptyl sebacate | | | | 15 | | | | | | | | | |
| Dioctyl sebacate | | | | | 20 | | 10 | | | | | 3 | |
| Dinonyl sebacate | | | | | | | | 25 | | | | | |
| Di-2-ethylhexylazelate | | | | | | | | | | | | 5 | |
| Didecyl azelate | | | | | | | | | | | | | 15 |

NOTE: Adiprene L-100=Liquid urethane elastomer, marketed by Du Pont.
Epon 828=Liquid epoxy resin believed to be a reaction product of epichlorhydrin and bisphenol A, marketed by Shell Chemical Corporation.
MOCA=4,4' methylene bis-(2-chloroaniline).

In the Formulations A to M above, instead of Adiprene L-100, other urethane polymers can be employed such as Adiprene L-167 containing about 6.1% to about 6.5% isocyanate groups, and the like; in place of the Epon 828 epoxy resin of the above formulations other epoxy resins such as the glycidyl ether of glycerol or the glycidyl ether of bisphenol F can be employed; and instead of MOCA employed in the above Compositions A to M, other curing agents such as triethanolamine can be employed.

In preparing the adhesive formulation of the invention, all of the components of such formulation can be mixed together, including the liquid urethane polymer, epoxy resin, additive component, e.g., dialkyl adipate, and any optional components such as a silane as described above, but excluding the curing agent. When the adhesive is to be used, a curing agent such as MOCA is then mixed into the above described formulation, and the resulting adhesive formulation is applied to glass plates or lights to be laminated. An ambient temperature cure is obtained in a period of from about 4 to about 48 hours depending upon the amount of urethane polymer present, the particular curing agent employed and the amount thereof, and the particular adipate, sebacate or azelate additive, and without the application of pressure to the laminate. Maximum ultimate tensile strengths of the cured adhesive bond are not attained, however, until about 7 to about 21 days after incorporation of the curing agent.

Other alternative means for properly spacing the adjacent glass plates and providing the desired bond thickness include the employment of cured particles of the adhesive or of a like adhesive, or glass fibers, randomly dispersed in the liquid adhesive, such particles having a size such that a uniform layer of particles between the adjacent plates functions as a spacer to provide the desired space or bond thickness between plates. Also, a cured layer of the adhesive can be provided on one surface of a glass plate and by applying a thin layer of the liquid adhesive to the adjacent surface of the other glass plate the two plates can be bonded together with a total controlled thickness of bonding material. Also, felt in the form of a loose randor fiber glass mat can be applied to the surface of a plate, adhesive applied to impregnate the mat and the other glass plate applied to form a glass laminate having a controlled thickness.

The accompanying drawing illustrates production of glass laminates employing an adhesive as bonding material, according to the invention principles.

In the drawings:

FIG. 1 is a view in elevation illustrating introduction of adhesive in a space of predetermined thickness between two glass plates maintained properly separated by the use of separator means;

FIG. 2 is a side view of the assembly of FIG. 1, taken on line 2—2 of FIG. 1, showing one of the glass plates partly broken away for clarity;

FIG. 3 illustrates a section of a glass laminate having spacer means in the form of a woven glass mat impregnated with adhesive to form a bond of controlled thickness;

FIG. 4 shows another embodiment of the invention employing particles of cured adhesive of a given size according to the invention, and employed as spacer means between adjacent glass plates bonded together with the adhesive of the invention; and FIG. 5 illustrates the procedure for measuring and comparing the adhesive strength of various adhesive formulations.

It will be understood that the illustrations in the drawing are exaggerated for purposes of greater clarity.

Referring to FIGS. 1 and 2 of the drawing, a glass laminate 10 according to the invention is fabricated by placing a pair of glass plates or panels 12 and 14 adjacent each other and separated by a set predetermined distance from each other by means of suitable spacers 16 composed, for example, of pieces of previously cured similar adhesive or cement, inserted between the two plates at the four opposite corners of these plates as seen in FIG. 2. With this unit held together, a suitable tape is wound around the outer periphery of the glass plates, as indicated at 18, and turned up at the opposite edges as indicated at 18a, and enclosing the outer periphery of the space 19 provided between the adjacent plates. The resulting unit is then maintained in this position shown in FIG. 1, by suitable mounting means (not shown), and a filler hose 20 is inserted through the tape 18 adjacent the space 19, and having its discharge end protruding into such space. A liquid adhesive composition according to the invention, for example, Compositions B, I or J above, is introduced via the filter hose 20 into the space 19 of controlled thickness between the glass plates, until such space is completely filled with adhesive 22, but without applying any substantial pressure which would cause the plates to bulge away from each other. The hose 20 is then removed and the adhesive 22 now filling the space 19 is permitted to cure at room temperature. The tape 18 is then removed, providing a glass laminate 10 according to the invention, which can be employed as safety glass or architectural acoustical panels or lights. If desired, in employing the laminate formed as described above in FIGS. 1 and 2, the glass laminate may be cut so that the spacers 16 are eliminated from the assembly. Also, if desired, the assembly shown in FIGS. 1 and 2 can be inclined during introduction of the liquid adhesive into space 19, to reduce the pressure head required to fill such space with the adhesive. Alternatively, a vacuum may be applied adjacent the upper end 23 of the gap 19 by suitable means (not shown) and the adhesive drawn into the gap, or a combination of vacuum and pressure may be used to effectively cancel out all differential pressure on the glass panels 12 and 14.

Referring to FIG. 3, illustrating another means for providing a controlled thickness of cured adhesive according to the invention, between a pair of glass plates, a loosely woven glass mat indicated at 24 is impregnated with an adhesive composition 25 according to the invention, e.g., Composition E, F or K above, and such adhesive-impregnated fiber glass mat is sandwiched between a pair of glass plates 12a and 14a. A modest pressure is applied to the two plates 12a and 14a and the adhesive is cured at room temperature to provide a glass laminate 26 having utility as safety glass, or as acoustical or architectural glass. Alternatively, a vacuum may be used as previously described, to draw the composition into the space between plates 12a and 14a. The fiber glass mat employed should have an index of refraction of about 1.56 or close enough to that of the cured adhesive bond so that the fibers are invisible after curing is completed.

In FIG. 4 there is illustrated another means for providing a controlled adhesive bond thickness between the glass plates, according to the invention. In this embodiment, cured adhesive particles 28 of a controlled size, e.g., produced from composition G above, are distributed over the surface of a glass plate 12b and a liquid adhesive of composition similar to that of the cured particles 28, that is, liquid Composition G, is distributed at 29 over the surface of the glass plate 12b, essentially enveloping and covering the cured particles 28 in the layer. A glass plate 14b is then applied over this layer of adhesive 29 having the cured particles 28 dispersed therein, and a modest pressure is applied to the plates 12b and 14b, squeezing the plates together so that the thickness of the space and the adhesive bond between the plates is substantially that of the thickness of the particles 28. Alternatively, the particles may be embodied in the adhesive directly by inclusion into the composition before application to the panels. After curing at approximately room temperature, a glass laminate 30 is provided which is suitable for use as safety glass according to the invention.

Other techniques for controlling the thickness of the adhesive bond and the distance between adjacent glass plates of a glass laminate, e.g., in the form of a safety glass or acoustical glass panel, are described in our above copending applications and are incorporated herein by reference.

The following are additional examples of the invention:

EXAMPLE II

The adhesive formulations set forth below are prepared:

TABLE II

| Components | N | O | P | Q | R | S | T | U | V | W | X |
|---|---|---|---|---|---|---|---|---|---|---|---|
| Adiprene L-100 | 87 | 80 | 80 | 80 | 80 | 80 | 80 | 80 | 98 | 98 | 80 |
| Epon 828 | 20 | 20 | 20 | 20 | 20 | 20 | 20 | 20 | 2 | 2 | 20 |
| Silane A-187 | .25 | .25 | .25 | .25 | .25 | .25 | .25 | .25 | .25 | .25 | .25 |
| Cyasorb UV-9 | 2.5 | 2.5 | 2.5 | 2.5 | 2.5 | 2.5 | 2.5 | 2.5 | 2.5 | 2.5 | 2.5 |
| MOCA | 10 | 10 | 10 | 10 | 10 | 10 | 10 | 10 | 11 | 11 | 10 |
| Didecyl adipate | 10 | 50 | | | | | | | 5 | 10 | |
| Dibutyl sebacate | | | 10 | 30 | | | | | | | |
| Dioctyl sebacate | | | | | | | 30 | | | | |
| Di-2-ethylhexylazelate | | | | | | | | 10 | 30 | | |
| Aroclor 1221 | | | | | | | | | | | 10 |

NOTE: Aroclor 1221=A chlorinated biphenyl containing 21% combined chlorine by weight, marketed by Monsanto Chemical Company.

Each of the above Formulations N, P and X is tested for adhesive strength of the bond to glass in the following manner. The adhesive is impregnated into a 1 inch wide cotton twill tape indicated at 30' in FIG. 5 of the drawing, such cotton tape being approximately twice the length of a glass plate indicated at 32 in FIG. 5. A portion of the adhesive impregnated cotton tape having a length somewhat less than half the length of the cotton tape 30, is placed on the surface of the glass plate as indicated at 34, the remainder or somewhat more than half the length of such tape bent back and away from contact with the glass plate, as indicated at 36. The adhesive bond 38 between the contacting surfaces of the adhesive impregnated tape portion 34 and the glass plate 32 is cured for 14 days at ambient temperature (about 20° C.). After curing, the adhesive impregnated cotton tape 30' is cut into 1 inch strips and pulled at a standard rate in the direction indicated by the arrow in FIG. 5 to obtain a peel strength for each of the adhesive impregnated tapes containing the above adhesive formulations, in pounds per inch width of tape.

The results of these tests are indicated in the table below:

| Adhesive formulations— | Lbs. peel strength inch width |
| --- | --- |
| N | 51 |
| P | 48 |
| X | 53 |

From the test data set forth immediately above, it is noted that the adhesive Formulations N and P according to the invention, and containing didecyl adipate and dibutyl sebacate as additives, have an improved peel or adhesive strength which is approximately the same as Formulation X, containing a chlorinated biphenyl as plasticizer according to our above copending applications.

EXAMPLE III

Each of the Formulations N through X in Table II of Example II above are employed in forming a glass laminate as illustrated in FIGS. 1 and 2 of the drawing. Thus, each of these formulations is placed between two glass plates 12 and 14 to provide a controlled thickness of adhesive bond between such plates, as indicated at 22. Each of the bonded laminates formed using the respective adhesive Formulations N through X, and illustrated in FIGS. 1 and 2 of the drawing, is cured at ambient temperature for a period of about 7 days, without application of pressure.

Following curing, it is observed that all of the glass laminates formed employing adhesive Formulations N through W of the invention have a clear transparent odorless adhesive bond 22, whereas the laminate formed using adhesive Formulation X containing a chlorinated biphenyl in place of the adipate, sebacate or azelate of Compositions N through W, while having a clear adhesive bond at 24, has a disagreeable odor imparted thereto by the chlorinated biphenyl.

From the foregoing, it is seen that the novel adhesive formulation of the invention is particularly suited as a bonding material or adhesive for the production of glass laminates which have particular utility and outstanding properties for use as safety glass or as acoustical or architectural glass, and the adhesive provides a tough layer of a urethane-epoxy resin which is highly adherent to the glass substrates and strongly resists delamination of the glass plates or layers. The urethane polymer adhesive formulations containing an epoxy resin and curing agent, preferably in certain proportions, and also including dialkyl adipate, dialkyl sebacate or dialkyl azelate according to the invention, employed to produce glass laminates as described above, possess a number of other advantages, including low viscosity for proper flow over the entire surface between adjacent layers of the laminate, ability to cure rapidly at normal temperature and without employing high presures, high adhesion to the glass substrate under severe environmental conditions, good optical qualities of clarity and high index of refraction of the adhesive bond, closely approaching those of the glass layers, and freedom from disagreeable odors.

We claim:

1. An adhesive formulation which consists essentially of a urethane polymer and an epoxy resin in proportions ranging by weight from about 1 part of said epoxy resin and 99 parts of said urethane polymer, to about 60 parts of said epoxy resin and about 40 parts of said urethane polymer, based on 100 parts of the sum of said urethane polymer and epoxy resin, and a curing agent for curing said urethane polymer at room temperature but which is substantially nonreactive with said epoxy resin at room temperature, wherein said curing agent is a compound selected from the group consisting of polyamines and polyol compounds, the amount of said curing agent employed being only an amount which reacts stoichiometrically with the urethane polymer, and about 2 to about 50 parts of a member selected from the group consisting of dialkyl adipates, dialkyl sebacates and dialkyl azelates, wherein each of said alkyl groups of said member is a straight chain alkyl containing from about 4 to about 12 carbon atoms, based on 100 parts of the sum of said urethane polymer and epoxy resin.

2. An adhesive formulation as defined in claim 1, wherein each of said alkyl groups of said member is a straight chain alkyl containing from about 8 to about 10 carbon atoms.

3. An adhesive formulation as defined in claim 2 wherein said urethane polymer contains from about 4 to about 10% isocyanate groups, said epoxy resin is in the form of an epichlorohydrin-bisphenol A condensation product, and said urethane polymer is cured by 4,4'-methylene-bis-(2-chloroaniline).

4. An adhesive formulation as defined in claim 1, employing a minimum of about 80 parts of said urethane polymer and a maximum of about 20 parts of epoxy resin.

5. An adhesive formulation as defined in claim 1, employing a maximum of about 60 parts of said urethane polymer and a minimum of about 40 parts of said epoxy resin.

6. An adhesive formulation as defined in claim 1, employing about 4 to about 40 parts by weight of said member, and wherein said curing agent is 4,4'-methylene-bis-(2-chloroaniline), said curing agent being present in an amount of about 13 parts per 100 parts by weight of said urethane polymer.

7. An adhesive formulation as defined in claim 1, wherein said member is didecyl adipate.

8. An adhesive formulation as defined in claim 1, wherein said member is dioctyl sebacate.

9. An adhesive formulation as defined in claim 1, wherein said member is dibutyl sebacate.

10. A glass laminate comprising at least two glass plates adhesively bonded together by a cured urethane polymer containing epoxy resin, and a member selected from the group consisting of dialkyl adipates, dialkyl sebacates, and dialkyl azelates, said urethane polymer cured by a compound selected from the group consisting of polyamines and polyol compounds, and wherein each of said alkyl groups of said member is a straight chain alkyl group containing from about 4 to about 12 carbon atoms.

11. A glass laminate as defined in claim 10, said urethane polymer cured by a compound selected from the group consisting of polyamines and polyol compounds employed only in an amount which reacts stoichiometrically with the urethane polymer, and wherein each of said alkyl groups of said member is a straight chain alkyl group containing from about 4 to about 12 carbon atoms.

12. A high-strength glass laminate as defined in claim 10, wherein said epoxy resin is in the form of an epichorohydrin-bisphenol A condensation product, and said urethane polymer is cured by 4,4'-methylene-bis-(2-chloroaniline) employed only in an amount which reacts stoichiometrically with the urethane polymer, and wherein each of said alkyl groups of said member is a straight chain alkyl group containing from about 8 to about 10 carbon atoms.

13. A glass laminate as defined in claim 10, said member selectted from the group consisting of didecyl adipate, dioctyl sebacate and dibutyl sebacate.

References Cited

UNITED STATES PATENTS

| | | | |
|---|---|---|---|
| 2,832,754 | 4/1958 | Jex | 260—46.5 |
| 3,143,517 | 8/1964 | Heiss | 260—31.8X |
| 3,158,586 | 11/1964 | Krause | 260—830X |
| 3,290,208 | 12/1966 | Lewis et al. | 161—190 |
| 3,378,511 | 4/1968 | Newton | 260—31.8 |
| 3,391,054 | 7/1968 | Lewis et al. | 161—190X |

OTHER REFERENCES

Bodnar, M. J. and Kelly, E. R.: "Room-Temperature Curing of Polyurethane Adhesives," Adhesive Age, vol. 2, April 1959, pp. 29–33.

HAROLD ANSHER, Primary Examiner

R. A. KILLWORTH, Assistant Examiner

U.S. Cl. X.R.

156—330, 331; 161—190; 260—31.8, 830, 835